United States Patent [19]

Chevalier et al.

[11] Patent Number: 4,790,290
[45] Date of Patent: Dec. 13, 1988

[54] METHOD AND APPARATUS FOR FOAM INSULATING A VESSEL

[75] Inventors: James L. Chevalier, Mequon; Douglas D. King, Menomonee; John D. Pfeffer, Brookfield, all of Wis.

[73] Assignee: A. O. Smith Corporation, Milwaukee, Wis.

[21] Appl. No.: 101,847

[22] Filed: Sep. 28, 1987

[51] Int. Cl.$^4$ .......................... F24H 1/00; B29C 65/00
[52] U.S. Cl. ..................................... 126/361; 126/373; 264/46.5
[58] Field of Search ............... 126/373, 374, 380, 389, 126/350 D, 361; 220/444, 902; 264/46.5, 46.9, 45.2

[56] References Cited

U.S. PATENT DOCUMENTS

| | | | |
|---|---|---|---|
| 3,570,266 | 3/1971 | Alvarez et al. | 62/389 X |
| 4,372,028 | 2/1983 | Clark et al. | 29/460 |
| 4,447,377 | 5/1984 | Denton | 264/45.2 |
| 4,477,399 | 10/1984 | Tilton | 264/45.2 |
| 4,527,543 | 7/1985 | Denton | 126/361 |
| 4,541,410 | 9/1985 | Jatana | 126/360 R X |

FOREIGN PATENT DOCUMENTS 2523087  9/1983  France .............................. 126/375

Primary Examiner—Larry Jones
Attorney, Agent, or Firm—Andrus, Sceales, Starke & Sawall

[57] ABSTRACT

A method and apparatus for providing foam resin insulation for a vessel, such as a water heater. The water heater includes a tank to contain water to be heated and has a plurality of openings to receive components of the water heater. A jacket is spaced outwardly of the tank to provide a space therebetween to receive foam resin insulation. Prior to introducing the resin into the space, an elongated member, such as a rod, is engaged with the opening in the tank and the rod extends outwardly through an aligned opening in the jacket. A resilient pad, which is movable on the rod, is compressed against the outer surface of the jacket to seal the space between the jacket opening and the rod. A liquid foamable resin is introduced in the space between the tank and the jacket and expands to fill the space and provide an insulating layer.

16 Claims, 1 Drawing Sheet

METHOD AND APPARATUS FOR FOAM INSULATING A VESSEL

BACKGROUND OF THE INVENTION

The conventional water heater includes a tank to contain water to be heated and an outer jacket or casing which is spaced from the tank. It has been the practice in the past to insulate the water heater by a layer of fiber glass which is positioned in the space between the tank and the outer jacket.

More recently, water heater tanks have been insulated through use of a foamable resin, such as polyurethane. The resin is introduced in the liquid state into the space between the tank and jacket and the resin expands to fill the space and provide a semirigid foam resin insulating layer.

As the heat conductivity of the foam resin, such as polyurethane foam, is lower than that of fiber glass, the thickness of the insulation can be reduced to obtain the same insulating characteristics, as opposed to a layer of fiber glass. This results in a reduced overall size for a water heater of given capacity, thereby resulting in substantial material savings, as well as shipping and handling savings.

In the production of water heaters, certain components are installed within openings in the tank during the manufacture of the water heater, such as the thermostat, drain valve, and electric heating element, if the water heater is of an electric type. These components are generally threaded to spuds that are welded to the outer surface of the tank wall bordering openings in the tank wall, and the outer jacket of the water heater has openings through which these components extend to the exterior. With components of this type, the resin when introduced into the space between the tank and jacket, will foam around the components and bond to the components. However, the space or gap between the components and the openings in the jacket must be sealed to prevent the resin from leaking through the gap to the exterior.

Other components for the water heater, such as nipples which are connected for the water inlet and outlet pipes and the pressure relief valve, are normally installed by the plumber during the on-site installation of the water heater and thus access holes must be provided in the foam resin layer through which these components can be attached to the tank.

In one manner of providing the foam resin insulation, an annular bag is positioned in the space between the tank and jacket and serves as a compartment to receive the liquid resin. To provide access openings through the foamed resin layer, the inner and outer surfaces of the bag are pinched or heat sealed together to prevent the resin from expanding into the heat sealed areas. However, this method of providing the access openings develops openings which are of substantially different size than the components which are subsequently to be attached to the tank with the result that there are gaps in the insulation layer which reduces the overall efficiency of the insulation.

SUMMARY OF THE INVENTION

The invention is directed to a method and apparatus for foam insulating a vessel, such as a water heater. In one form of the invention, access openings are formed in the foam resin insulating layer so that components of the tank can be subsequently inserted through the access openings and assembled with the tank. In accordance with this form of the invention, the apparatus includes an elongated rod or pipe having an inner end which is engaged with an opening in the tank wall. The rod or pipe extends outwardly through an aligned opening in the jacket and a resilient pad is movably mounted on the outer portion of the rod and bears against the outer surface of the jacket to seal the gap between the jacket and the rod.

Positioned outwardly of the resilient pad is a rigid disc, or pressure member, which acts to compress the resilient pad against the jacket, and the disc can be locked to the rod to resist outward movement of the resilient pad and disc due to the pressure of the resin as the resin expands in the space between the jacket and the tank. Expansion of the resin fills the space between the tank and the jacket, and the resilient pad prevents the resin from leaking out through the space between the rod and the opening in the jacket.

After the resin has fully expanded to fill the space between the jacket and the tank, the rod is disengaged from the tank opening and withdrawn, leaving an access opening in the foam resin through which the various components can be inserted and threaded to the spud for attachment to the tank.

The access opening can be produced with a configuration similar to that of the component to be subsequently inserted into the opening to thereby eliminate voids in the insulation layer and reduce the standby heat loss of the water heater.

In a second form of the invention, the tank component, such as a drain valve or thermostat, includes a pipe or tube which is inserted through the opening in the jacket, and the inner end of the pipe is threaded to the spud that is welded to the outer surface of the tank bordering the tank opening. Mounted for sliding movement on the outer end of the pipe is a resilient disc or pad that is compressed against the outer surface of the jacket by a rigid backing or pressure member.

During foaming, the resilient pad will act to seal the space or gap between the pipe and the opening in the jacket to prevent the resin from expanding outwardly through the space. After the foaming operation is completed, the resilient pad and backing member form a permanent part of the tank assembly.

The apparatus can be utilized with various size water heaters that may have different spacing between the tank and the outer jacket.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
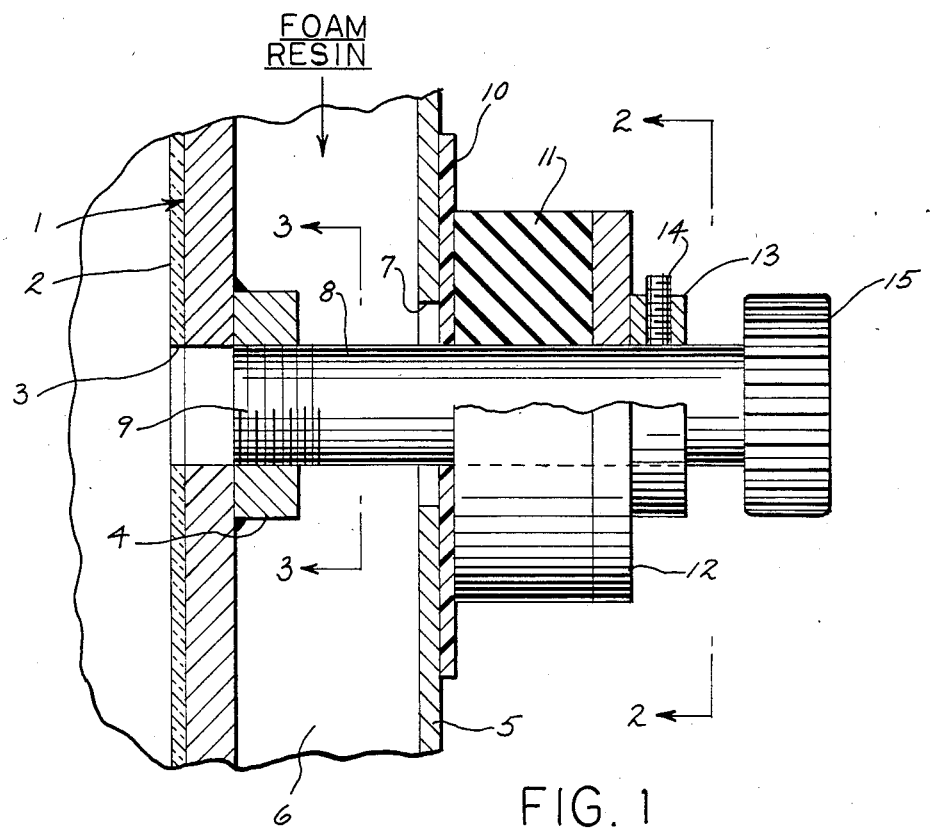
FIG. 1 is a fragmentary vertical section of a portion of a water heater utilizing the apparatus of the invention.

FIG. 1 shows a portion of a conventional water heater that includes a steel tank 1. The tank 1 is normally composed of a generally cylindrical shell enclosed at its ends by upper and lower head, respectively.

The inner surface of tank 1 can be coated with a corrosion resistant material 2, such as glass or porcelain enamel.

Tank 1 is formed with a plurality of openings 3 and an annular internally threaded spud 4 is welded to the outer surface of the tank in alignment with each opening 3. In its final assembled form, various components, such as the inlet and outlet water nipples, a thermostat, a sacrificial anode, a drain valve, and an electric heating element, if the water heater is electrically operated, are attached to tank 1 by threading to the spuds 4.

An outer metal jacket or casing 5 is spaced outwardly from tank 1 and defines an annular space or compartment 6, which is to be filled with the foam resin insulation, such as polyurethane resin. Jacket 5, as shown in FIG. 1, is formed with an opening 7 that is aligned with each opening 3 in tank 1.

Figure 2:
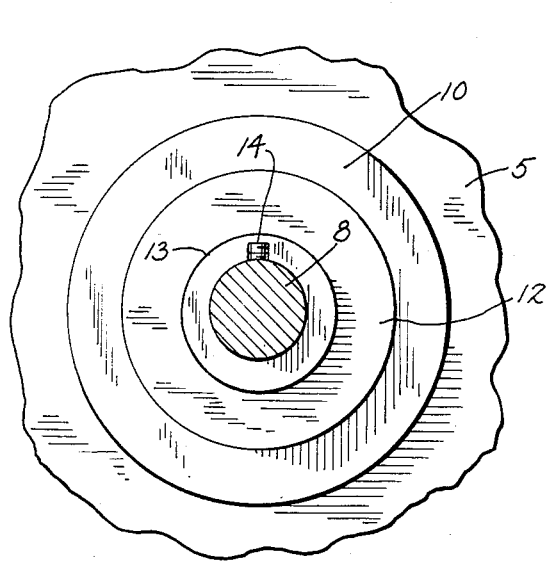
FIG. 2 is a section taken along line 2—2 of FIG. 1.

The apparatus as illustrated in FIGS. 1 and 2, is adapted to be attached to the tank prior to the introduction of the liquid resin into the space 6, and on removal of the apparatus after the foaming operation, an access opening is formed in the layer of insulation through which the various components can be inserted and attached to the spud 4.

The apparatus includes an elongated rod or pipe 8 having an externally threaded end 9 which is threaded to spud 4. The outer portion of rod 8 extends outwardly through opening 7 and a sheet of release material 10, such as polyethylene film, is disposed around the rod 8 and bears against the outer surface of jacket 5.

While FIG. 1 shows rod 8 being threaded to spud 4, the rod can be attached to the opening in the tank by other means, such as a magnetic coupling or hook.

Located outwardly of the sheet 10 is an annular resilient pad 11 formed of foam rubber, or the like, which is slidable on rod 8. A rigid backing disc or pressure member 12 formed of metal or plastic bears against the outer surface of resilient pad 11, and a collar 13 is formed integrally with disc 12. The disc 12 and collar 13 can be locked in position on rod 9 by a set screw 14, which is threaded in a radial opening in collar 13 and bears against rod 8. Other fasteners or mechanism can be used in place of set screw 14 to lock the pressure member 12 to rod 9.

Located on the outer end of rod 8 is a hand knob 15 through which the rod can be rotated. Alternately, the outer end of the rod can be formed with wrench flats to receive a wrench, or other tool, to permit rotation of the rod.

To install the device, rod 8 is inserted through opening 7 in jacket 5 and the inner end 9 of the rod is threaded in spud 4. The release sheet 10, resilient pad 11 and backing disc 12 are then moved axially along the outer portion of the rod into engagement with the outer surface of jacket 5, as shown in FIG. 1. Set screw 14 is then turned down to lock the pad 11 and backing disc 12 in that position. Further threading of rod 8 in spud 4 will then compress pad 11 to seal the space between opening 7 and rod 8.

The liquid resin, such as a polyurethane resin, is then introduced into the space 6 and the resin will expand to completely fill the space and provide the insulating layer. After the foaming operation has been completed, rod 8 can be unthreaded from spud 4, through operation of the hand knob 15, and the device removed from the tank. While the foamed resin will tend to adhere to the rod 8, the resin has little shear strength, so that the rod can be readily broken away from the resin and withdrawn through the opening 7.

After withdrawal of rod 8, an access opening is provided in the foam resin layer, through which the component, such as a water inlet or outlet nipple, can be inserted for attachment to spud 4.

When the device is utilized with tanks of the same size, having the same spacing between tank 1 and jacket 5, the rigid backing disc 12 can be left in the locked position without need of releasing the set screw. With the pad and backing disc locked in place, the rod 8 is inserted through opening 7 and threaded in spud 4, and the threading is continued until the pad is sufficiently compressed to provide a positive seal of opening 7 to prevent the resin from expanding through opening 7 to the exterior.

The release sheet 10 is not necessary to the invention, but prevents the foamed resin from adhering to the resilient pad, so that the device can be reused merely by replacing the release sheet and not having to replace the pad 11.

The access opening produced by the apparatus of the invention has a diameter which generally conforms to the diameter of the component to be attached to the tank. Thus, there is minimal space or void between the foam resin insulation and the assembled component, thereby providing a more uniform insulating layer and reducing standby heat loss.

Figure 3:
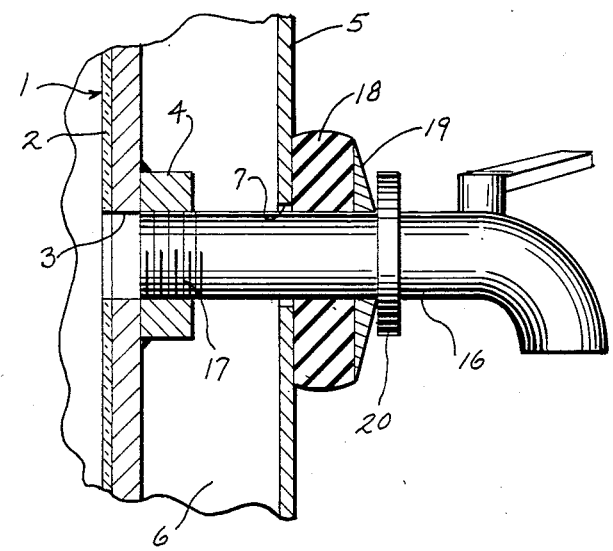
FIG. 3 is a fragmentary vertical section of a modified form of the invention.

FIG. 3 illustrates a modified form of the invention, in which a component is attached to the water heater tank 1 prior to introducing the liquid foamable resin in the space 6 between the tank and the jacket 5.

As shown in FIG. 3, the component comprises a drain valve 16 having an inner threaded end 17 which is threaded within spud 4 that is welded to the outer surface of tank 1.

Mounted for sliding movement on the drain valve 16 is a resilient pad 18, similar in construction and function to pad 11 of the first embodiment. A rigid disk or pressure member 19, formed of metal or other rigid material, is positioned against the outer surface of resilient pad 18.

An annular collar 20 is fixed or secured to the drain valve 16 and is located outwardly of the pressure member 19. As drain valve 16 is threaded in spud 4, collar 20 will engage pressure member 19 and as the threading is continued, pad 18 will be compressed against the outer surface of jacket 5 to seal the space between opening 17 and drain valve 16, thereby preventing the resin during the foaming operation from escaping through the space.

After the foaming operation has been completed, the pad 18 and pressure disc 19 remain as a permanent part of the water heater assembly.

As illustrated in FIG. 3, collar 20 engages the pressure member 19 to compress pad 18. However, in other installations where the drain valve 16 may have a greater length, a wedge or spacer can be inserted between collar 20 and pressure member 19 to provide the desired force against the pad 18 to compress the pad on threading of the drain valve or pipe.

While FIG. 3 has illustrated the attachment of a drain valve to the tank, it is completed that other components, such as a thermostat, can be attached in a similar manner.

Various modes of carrying out the invention are contemplated as being within the scope of the following claims particularly pointing out and distinctly claiming the subject matter which is regarded as the invention.

We claim:

1. A tank assembly comprising, a tank to contain a fluid and having aperture means therein, a jacket spaced outwardly of said tank and having a hole aligned with said aperture means, the space between said tank and said jacket adapted to receive a liquid foamable resin, an elongated member engaged with said aperture means and extending outwardly through said hole in said jacket, resilient sealing means connected to the outer portion of said elongated member and disposed in contact with the outer surface of said jacket, rigid pressure means disposed against the outer surface of said sealing means, and means for moving said pressure means in a direction toward said jacket to exert a force against said sealing means to compress said sealing means against the outer surface of said jacket and seal said hole.

2. The apparatus of claim 1, and including a sheet of release material disposed on the inner surface of said sealing means and disposed to engage the outer surface of said jacket.

3. The apparatus of claim 2, wherein said elongated member is threaded in said aperture means.

4. The apparatus of claim 3, and including means on the outer end of said elongated member for rotating said elongated member to thereby thread said elongated member in said aperture means.

5. The apparatus of claim 1, wherein said sealing means and said pressure means are mounted for longitudinal movement on said elongated member.

6. The apparatus of claim 5, wherein said elongated member is a tube.

7. The apparatus of claim 5, wherein the inner end of said elongated member is threadedly engaged with said aperture means.

8. In combination, a water heater tank to contain water to be heated and having an opening therein, a jacket spaced outwardly of said tank to provide a space therebetween to receive a foamable resin insulating layer, said jacket having a hole aligned with said opening, an internally threaded annular spud welded to the outer surface of the tank in alignment with said opening, an elongated member having a threaded inner end threadedly engaged with said spud, said elongated member extending through said hole to the exterior of the jacket, a resilient pad movably mounted for axial movement on the outer portion of the elongated member and disposed in contact with the outer surface of said jacket, a rigid backing member mounted for axial movement on said elongated member and disposed in contact with the outer surface of said resilient pad, and means for exerting a force through said backing member against said pad to compress said pad and seal said hole.

9. The combination of claim 8, wherein said hole is larger than said elongated member to provide a gap therebetween, said pad sealing said gap.

10. In a method of making a water heater, the steps of forming an opening in a water heater tank, spacing a jacket around the tank and aligning a hole in the jacket with said opening, inserting an elongated member into the hole with the inner end of said elongated member closing off said opening and the outer end of said elongated member extending outwardly of said jacket, mounting a resilient sealing member on the outer end of said elongated member and positioning said sealing member tightly against the outer surface of said jacket to seal said hole, positioning a rigid back member against the outer surface of said sealing member, and exerting a force axially through said back member and against said sealing member to compress said sealing member against the outer surface of said jacket.

11. The method of claim 10, and including the steps of welding an internally threaded annular spud to the outer surface of the tank in alignment with the opening in the tank wall, and threading the inner end of said elongated member into said spud.

12. The method of claim 10, and including the step of locking said backing member against axial movement relative to said elongated member.

13. The method of claim 10, and including the step of withdrawing the elongated member through said hole to provide an access opening in the foam resin layer.

14. In combination, a water heater tank to contain water to be heated and having a threaded opening therein, a jacket spaced outwardly of said tank to provide a space therebetween to receive a foamable resin insulating layer, said jacket having a hole aligned with said opening, an elongated member having a threaded inner end threadedly engaged with said opening, said elongated member extending through said hole to the exterior of the jacket, a resilient pad mounted on the outer portion of the elongated member and disposed in contact with the outer surface of said jacket, and a rigid backing member locked in position relative to the elongated member and disposed in contact with the outer surface of said resilient pad, whereby threading of said elongated member in said opening moves said backing member toward said jacket to exert a force against the pad to compress the pad and seal said hole.

15. In combination, a water heater tank to contain water to be heated and having an opening therein, a jacket spaced outwardly of said tank to provide a space therebetween to receive a foamable resin insulating layer, said jacket having a hole aligned with said opening, an elongated member having an inner end enclosing said opening, said elongated member extending through said hole to the exterior of the jacket, a resilient pad mounted on the outer portion of the elongated member and disposed in contact with the outer surface of said jacket, a rigid backing member mounted on said elongated member and disposed in contact with the outer surface of said resilient pad, movement of said backing member in a direction toward said jacket acting to compress said pad and seal said hole, and means for locking said backing member to said elongated member.

16. In a method of making a water heater, the steps of forming a threaded opening in a water heater tank, spacing a jacket around the tank and aligning a hole in the jacket with said opening, inserting a threaded elongated member through the hole with the outer end of said elongated member extending outwardly of said jacket, mounting a resilient sealing member on the outer end of said elongated member and positioning said sealing member tightly against the outer surface of said jacket to seal the hole, securing a rigid backing member to said elongated member and positioning said backing member against the outer surface of said sealing member, threading the inner end of said elongated member in said opening to draw said backing member toward said jacket and compress said sealing member against said jacket to seal said hole, and introducing a foamable resin into said space with said resin expanding within said space and surrounding said elongated member.

* * * * *